Figure 1:
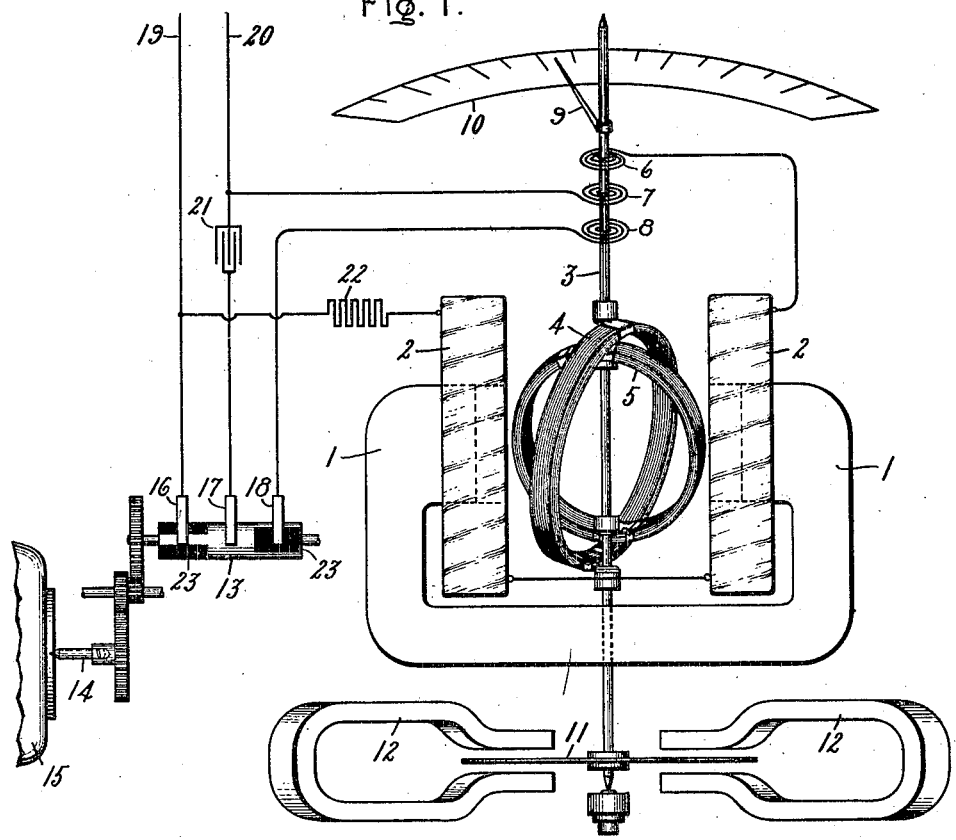

No. 838,410. PATENTED DEC. 11, 1906.
O. HOLZ.
ELECTRIC MEASURING INSTRUMENT.
APPLICATION FILED JULY 14, 1905.

Witnesses:
George W. Tilden.
Helen A. Ford

Inventor
Otto Holz,
by Albert H. Davis
Att'y.

UNITED STATES PATENT OFFICE.

OTTO HOLZ, OF SCHENECTADY, NEW YORK, ASSIGNOR TO GENERAL ELECTRIC COMPANY, A CORPORATION OF NEW YORK.

ELECTRIC MEASURING INSTRUMENT.

No. 838,410.      Specification of Letters Patent.      Patented Dec. 11, 1906.

Application filed July 14, 1905. Serial No. 269,620.

*To all whom it may concern:*

Be it known that I, OTTO HOLZ, a citizen of the United States, residing at Schenectady, county of Schenectady, State of New York, have invented certain new and useful Improvements in Electric Measuring Instruments, of which the following is a specification.

This invention relates to electric measuring instruments, and more particularly to an instrument similar to a frequency-indicator having its actuating-coil supplied with a pulsating current from a source of supply of direct current.

In order to facilitate the use of alternating-current apparatus, electric measuring instruments have been constructed to indicate the frequency of the alternations of the current. An instrument of this type can be employed on a direct-current circuit by providing means for admitting the current to the actuating-coil of the instrument in frequently-recurring impulses—as, for instance, by arranging a reactance, such as a condenser or an inductance—to be alternately charged from the direct-current mains and then discharged through the actuating-coil of the instrument. As the movements of the moving element of the instrument are dependent upon the frequency of these current impulses, the instrument may be used as an indicator for the force or mechanism controlling the frequency of the impulses. Thus the impulses may be obtained by employing a rotary commutator driven by the shaft of a machine. The instrument may then be used as a tachometer and may be calibrated to read in revolutions per minute. The movements of the moving element in the stationary magnetic field of such an instrument are responsive to the magnitude of the current impulses that flow through the actuating-coil, as well as to the frequency of those impulses, and it is therefore of great importance in order to get accurate readings that the voltage of the direct current which supplies the condenser be maintained constant or that means be provided for compensating for variations in the voltage. In order to effect this compensation, I provide a coil acting at an angle to the actuating-coil and connected in the direct-current circuit, so that the voltage impressed upon its terminals varies with the voltage of the lines. In this way a variation of the voltage affects both the actuating-coil and the compensating coil and does not vary the angular position of the resultant magnetic field due to these two coils in the stationary magnetic field of the instrument, the only effect of such a variation of voltage being to change the strength of this resultant field. Such a variation of voltage therefore has no effect whatever on the position of the moving element of the instrument, provided the moving element be free to assume any position. For the same reason this construction makes the instrument independent of variations in the strength of the stationary magnetic field due to the gradual weakening of a permanent magnet or a change in the current flowing through the energizing-coils of an electromagnet.

The novel features of my invention will be definitely indicated in the claims appended hereto.

I will now describe my invention as embodied in a tachometer for indicating the speed of a rotating shaft with reference to the accompanying drawings, in which—

Figure 2:
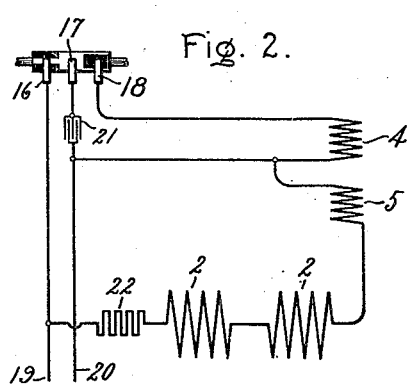
Figure 3:
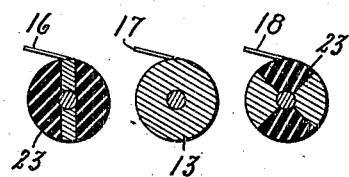

Figure 1 is a diagrammatic view. Fig. 2 is a diagram of the circuits, and Fig. 3 shows three sectional views of the three-part commutator.

The indicating instrument has a moving element mounted for rotation in a magnetic field established by a permanent magnet or preferably by an electromagnet consisting of a core 1 and energizing-coils 2 2. The moving element consists of a shaft 3, supported in suitable bearings and carrying two coils 4 and 5 angularly displaced and both fixed to the shaft 3. The shaft is perfectly free to assume any deflected position, and to this end the leads to the coils on the moving element are made as flexible as possible and no return-springs are employed. Current is led to the moving element by three flexible spirals 6, 7, and 8, as nearly non-elastic as possible, each of which has one end secured to shaft 3 and the other end to a bracket mounted on a stationary part of the instrument. The actuating-coil 4 is connected between the flexible spirals 7 and 8, and the compensating coil 5 between spirals 6 and 7 by leads running up the shaft from the coils to the inner ends of the spirals. Mounted on shaft 3 is an indicator 9, which moves over a suitable scale 10. A disk 11 of conducting material is also mounted on shaft 3 and permanent magnets 12 12 are arranged in cooperative relation to disk 11 to dampen the oscillations of the moving element.

13 indicates a commutator which is arranged in any suitable manner to be driven by the shaft whose speed is to be measured. In the drawings I have shown the commutator geared to a spindle 14, whose end is tapered to a point which is adapted to be held against the end of a driven shaft 15 to communicate rotary movement to the commutator 13. It is obvious, however, that the commutator may be provided with a larger number of segments and be driven direct from the shaft 15 without the interposition of gearing. The commutator 13 is preferably made from a cylindrical piece of solid metal by cutting the metal away at the ends on opposite sides and filling in the cut-away portions with insulation, as indicated at 23, so as to form on the periphery of the commutator two segments at one end angularly displaced from two segments at the other end. Fig. 3 shows sectional views of the three portions of the commutator. Brushes 16, 17, and 18 are arranged to bear one on each of the three portions of the commutator 13. It will be seen from the drawings that the brush 17 bears at all times on the metallic portion of the commutator and that brushes 16 and 18 are alternately electrically connected to and insulated from the commutator and from the brush 17.

19 and 20 indicate mains from a source of supply of direct-current electric energy. The main 19 is connected to brush 16 and the main 20 to one terminal of a reactance, such as a condenser or an inductance. In the drawings I have shown a condenser 21. The other terminal of the condenser is connected to the brush 17. The brush 18 is connected to the flexible spiral 8, to which one terminal of the actuating-coil 4 is connected, and the spiral 7 connected to the other terminal of the actuating-coil 4, is connected to the main 20. The compensating coil 5 is connected across the mains 19 and 20. In the drawings I have illustrated this coil as connected in series with the field-coils 2 2 and a resistance 22, the circuit being from main 19 through resistance 22 and the coils 2 2 to the spiral 6, thence through the compensating coil 5 to the spiral 7 and back to the main 20.

To use the device as a tachometer, the end of spindle 14 is held against the end of the driven shaft 15, so as to drive the commutator 13 at a speed bearing a definite relation to the speed of the driven shaft 15. When the commutator is in the position illustrated in the drawings, the condenser 21 is charged as the circuit is completed from the main 19 through brush 16, the commutator 13, and brush 17 to one terminal of the condenser 21, and by the main 20 to the other terminal of the condenser. After a partial rotation of commutator 14 the insulation comes under the brush 16, thus disconnecting the condenser from the mains, and further rotation brings a conducting-segment under the brush 18. This connects the condenser 21 to the actuating-coil 4, the circuit being from the condenser to the brush 17, through commutator 13 to brush 18, then to the spiral 8, through the actuating-coil 4 to spiral 7, and back to main 20 and the other side of the condenser. As the commutator 13 is rotated this action takes place continually—namely, the condenser 21 is charged from the mains 19 20 and then discharged through the actuating-coil 4. The coil 4 is therefore supplied from the direct-current mains with frequently-recurring current impulses depending upon the speed of the driven shaft for their frequency and on the voltage across the direct-current lines for their magnitude. The current flowing in the coil sets up a magnetic field, and if the moving element of the instrument were provided with a zero-seeking force, such as a retracting-spring attached to shaft 3, the parts could be so arranged that this field would react upon the field set up by the stationary coils 2 2 and cause a deflection of the moving element against the tension of the retracting-spring. In this case variations of voltage across the lines 19 20 would change the deflection of the moving element by varying the magnitude of the current impulses flowing in the coil 4, and hence the field set up by that coil. In order to make the instrument independent of variations in the line-voltage, the coil 5 is mounted upon shaft 3 at an angle to coil 4 and connected across the lines 19 20, so that the current flowing therein also varies with the line-voltage. The current flowing in the coils 4 and 5 establishes a resultant magnetic field, and it will be seen that a variation in the line-voltage, though it changes the strength of this resultant field by changing the current-flow through the two coils, does not cause a shifting in the angular position of the field. Such a change in the angular relation of the resultant field will take place, however, when the frequency of the current impulses flowing through coil 4 changes, as this varies the magnetizing effect of coil 4 relatively to that of coil 5. This is due to the fact that in case of a condenser the current is increased with the frequency, and in case of an inductance the current is decreased, and in both cases there is a variation in the magnetizing effect. As the moving element of the instrument is free to rotate on its pivots in either direction, the magnetic field set up by the stationary coils 2 2 will cause the moving element to turn on its pivots in response to every such change in the resultant field due to coils 4 and 5, and hence to every change in the frequency of the current impulses in coil 4.

The deflection of the moving element will therefore be responsive to the speed of the driven shaft and will be independent of the voltage across the lines 19 20 and independent of the strength of the stationary magnetic field.

It is obvious that instead of obtaining the current impulses in the actuating-coil 4 by discharging the condenser through it these impulses may be obtained when the condenser is being charged by connecting the coil 4 in one of the lines leading to the condenser while the latter is being charged and then disconnecting it and discharging the condenser by short-circuiting it. It is also obvious that instead of the condenser 21 a transformer or an inductance-coil may be used in the same manner to supply current impulses to the actuating-coil 4. When using an inductance, I prefer to so arrange the segments of the commutator that the discharging-circuit of the inductance and the actuating-coil is closed by the commutator before the charging-circuit of the mains 19 and 20 and the inductance is opened, so as to prevent sparking at the commutator when the latter circuit is opened. A tachometer constructed in this manner possesses the further advantage that readings can be made at a distance from the machine whose speed is being measured and at the same point where other measurements are being made.

While I have described the preferred form of my invention, other constructions may be employed which will occur to those skilled in the art. For example, the external or stationary magnetic field may be established by the coils 4 and 5, which may be fixed, and an iron vein or armature may be attached to the shaft which will turn on its pivots in response to the frequency of the current impulses in one of the fixed coils. All such modifications I consider within the scope of my invention, and I aim to cover them within the terms of the claims appended hereto.

What I claim as new, and desire to secure by Letters Patent of the United States, is—

1. A frequency-indicator comprising a movable index, a plurality of coils placed at an angle to each other for operating said index, means for producing a magnetic field in which said coils operate, means for passing current impulses of the frequency to be measured through one coil, and means for passing a direct current of the same voltage through the other coil.

2. The combination of means for establishing a magnetic field, a plurality of coils arranged at an angle to each other and mounted for rotation in said field, an indicator controlled thereby, leads from a source of direct-current supply, means connected thereto for supplying current impulses to one of said coils, and connections from said leads for supplying direct current to the other coil.

3. The combination of a frequency-indicator having a plurality of coils arranged at an angle to each other, means for establishing a magnetic field in which said coils operate, leads from a source of direct-current supply, a reactance and a commutator connected to said leads for supplying current impulses to one of said coils, and means for supplying a continuous current to the other coil whereby the instrument becomes independent of changes in the voltage across said leads.

4. The combination of a frequency-indicator having means for establishing a magnetic field, a pivoted unbiased shaft and a plurality of coils arranged at an angle to each other mounted thereon for rotation in said field, leads from a source of direct-current supply, and means connected thereto for supplying one of said coils with current impulses, and connections from another of said coils across said leads.

5. The combination of a frequency-indicator having two coils arranged at an angle to each other and an unbiased indicator, means for establishing a magnetic field in which said coils operate, leads from a source of direct-current supply, a reactance, a commutator arranged to alternately charge the reactance from said leads and then discharge it through one of said coils, and connections from said leads to the other coil.

6. The combination of means for establishing a magnetic field, a pivoted shaft, a coil mounted thereon for rotation in said field, leads from a source of direct-current supply, a reactance, a commutator arranged to alternately charge the reactance from said leads and then discharge it through said actuating-coil, and a second coil carried by said shaft and connected across said leads.

7. A tachometer comprising a frequency-indicator having two coils arranged at an angle to each other and an unbiased indicator, means for establishing a magnetic field in which said coils operate, leads from a source of direct-current supply, means connected thereto for supplying current impulses to one of said coils at a frequency bearing a definite relation to the speed of the rotating shaft whose speed is to be measured, and connections from said leads to the other coil.

8. A tachometer comprising a frequency-indicator having two coils arranged at an angle to each other and an unbiased indicator, means for establishing a magnetic field in which said coils operate, leads from a source of direct-current supply, a reactance, a commutator arranged to alternately charge the reactance from said leads and then discharge it through one of said coils at a frequency bearing a definite relation to the speed of the rotating element whose speed is to be measured, and connections from said leads to the other coil.

9. A tachometer comprising a frequency-indicator having an actuating-coil, means for establishing a magnetic field in which said coil operates, mains from a source of direct-current supply, a condenser, a commutator arranged to be driven by the shaft whose speed is to be measured to alternately charge the condenser from said mains and then discharge it through said actuating-coil, and means for rendering the indicator independent of variations in the voltage across said mains.

10. A tachometer comprising means for establishing a magnetic field, an actuating-coil mounted for rotation in said field, an indicator controlled thereby, mains from a source of direct-current supply, means connected thereto for supplying current impulses to said actuating-coil at a frequency bearing a definite relation to the speed of the rotating element whose speed is to be measured, and means for rendering the positions of said actuating-coil independent of variations in the strength of said magnetic field.

11. A tachometer comprising means for establishing a magnetic field, a pivoted shaft, an actuating-coil mounted thereon for rotation in said field, mains from a source of direct-current supply, means connected thereto for supplying current impulses to said actuating-coil at a frequency bearing a definite relation to the speed of the rotating element whose speed is to be measured, and a second coil carried by said shaft and connected across said mains.

In witness whereof I have hereunto set my hand this 12th day of July, 1905.

OTTO HOLZ.

Witnesses:
BENJAMIN B. HULL,
HELEN ORFORD.